United States Patent
Xu et al.

(10) Patent No.: US 8,109,687 B2
(45) Date of Patent: Feb. 7, 2012

(54) TELESCOPIC ADJUSTING MECHANISM

(75) Inventors: Da-Hui Xu, Taipei (TW); Hong-Ying Li, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 612 days.

(21) Appl. No.: 12/219,002

(22) Filed: Jul. 15, 2008

(65) Prior Publication Data

US 2009/0190995 A1    Jul. 30, 2009

(30) Foreign Application Priority Data

Jan. 26, 2008    (CN) .......................... 2008 1 0026099

(51) Int. Cl.
*A47B 57/06* (2006.01)
(52) U.S. Cl. ............. 403/109.3; 403/109.8; 108/147.21; 211/187; 211/190; 211/208
(58) Field of Classification Search ............... 403/109.1, 403/109.2, 109.3, 109.6, 109.7, 109.8; 108/147.21, 108/146; 211/187, 188, 190, 194, 195, 207, 211/208
See application file for complete search history.

(56) References Cited

U.S. PATENT DOCUMENTS

| | | | | |
|---|---|---|---|---|
| 5,727,898 A | * | 3/1998 | Lu | 403/109.3 |
| 5,876,048 A | * | 3/1999 | Lee | 280/47.315 |
| 6,141,828 A | * | 11/2000 | Kuo | 16/113.1 |
| 6,609,271 B2 | * | 8/2003 | Kuo | 16/113.1 |

* cited by examiner

*Primary Examiner* — Michael P Ferguson
(74) *Attorney, Agent, or Firm* — Rosenberg, Klein & Lee

(57) ABSTRACT

A telescopic adjusting mechanism includes: an outer tube having a positioning unit; an inner tube having a hole and displaceable relative to the outer tube along a longitudinal axis; a locking unit displaceable along with the inner tube, and including a locking member movable along a transverse axis between a locking position, where the locking member extends through the hole to engage the positioning unit, and an unlocking position, where the locking member is disengaged from the positioning unit, and a biasing member biasing the locking member to the locking position, the locking unit being formed with an engaging member; a restraining member engaging releasably the engaging member when the locking member is at the unlocking position to prevent the locking unit from hindering retraction of the inner tube into the outer tube; and a drive unit operable to move the locking member from the locking position to the unlocking position.

10 Claims, 14 Drawing Sheets

TELESCOPIC ADJUSTING MECHANISM

CROSS-REFERENCE TO RELATED APPLICATION

This application claims priority of Chinese Application No. 200810026099.7, filed on Jan. 26, 2008.

BACKGROUND OF THE INVENTION

1. Field of the Invention

The invention relates to an adjusting mechanism, more particularly to a telescopic adjusting mechanism.

2. Description of the Related Art

As shown in FIG. 1, some existing telescopic adjusting mechanisms utilize hydraulic or pneumatic principles. However, these telescopic adjusting mechanisms are normally complex, difficult to assemble/disassemble, and costly. As shown in FIG. 2, another type of existing telescopic adjusting mechanism utilizes a corresponding pair of screw hole and screw rod to accomplish adjustments and facilitate securing of the adjusting mechanism at a desired extended state. However, this kind of structure is usually only suitable for bearing a limited amount of load, and the securing effect thereof is usually less than satisfactory. Some existing telescopic adjusting mechanisms even require an external control member, thereby resulting in an untidy overall appearance during use.

SUMMARY OF THE INVENTION

Therefore, the object of the present invention is to provide a telescopic adjusting mechanism that is relatively low cost, easy to operate, and secure.

According to the present invention, there is provided a telescopic adjusting mechanism that includes an outer tube, an inner tube, a locking unit, a restraining member, and a drive unit.

The outer tube is provided with a positioning unit, and has opposite first and second ends along a longitudinal axis.

The inner tube is extended into the outer tube via the first end, is formed with a first hole, and is displaceable relative to the outer tube along the longitudinal axis.

The locking unit is disposed in the inner tube, is displaceable relative to the outer tube along with the inner tube, and includes a locking member and a biasing member. The locking member is movable along a transverse axis perpendicular to the longitudinal axis between a locking position, where the locking member extends through the first hole in the inner tube to engage the positioning unit of the outer tube such that the inner tube is disposed at an extended position relative to the outer tube, and an unlocking position, where the locking member is disengaged from the positioning unit. The locking unit is formed with an engaging member. The biasing member biases the locking member to the locking position.

The restraining member is disposed in the inner tube, and engages releasably the engaging member of the locking unit when the locking member is disposed at the unlocking position so as to prevent the locking unit from hindering retraction of the inner tube into the outer tube.

The drive unit is associated operably with the locking member, and is operable to move the locking member from the locking position to the unlocking position against biasing action of the biasing member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
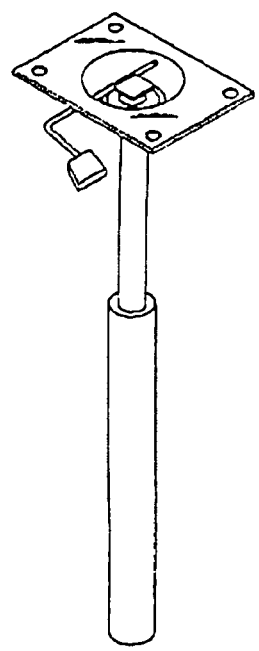
FIG. 1 is a perspective view of a conventional telescopic adjusting mechanism.
Figure 2:
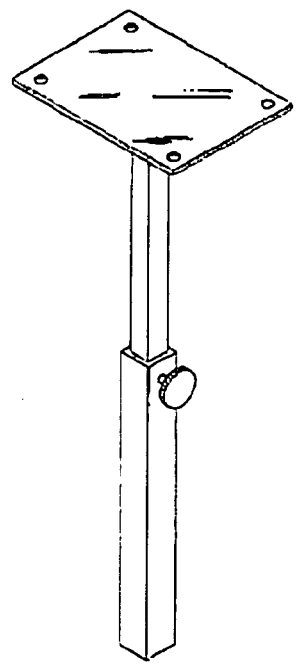
FIG. 2 is a perspective view of another conventional telescopic adjusting mechanism.
Figure 3:
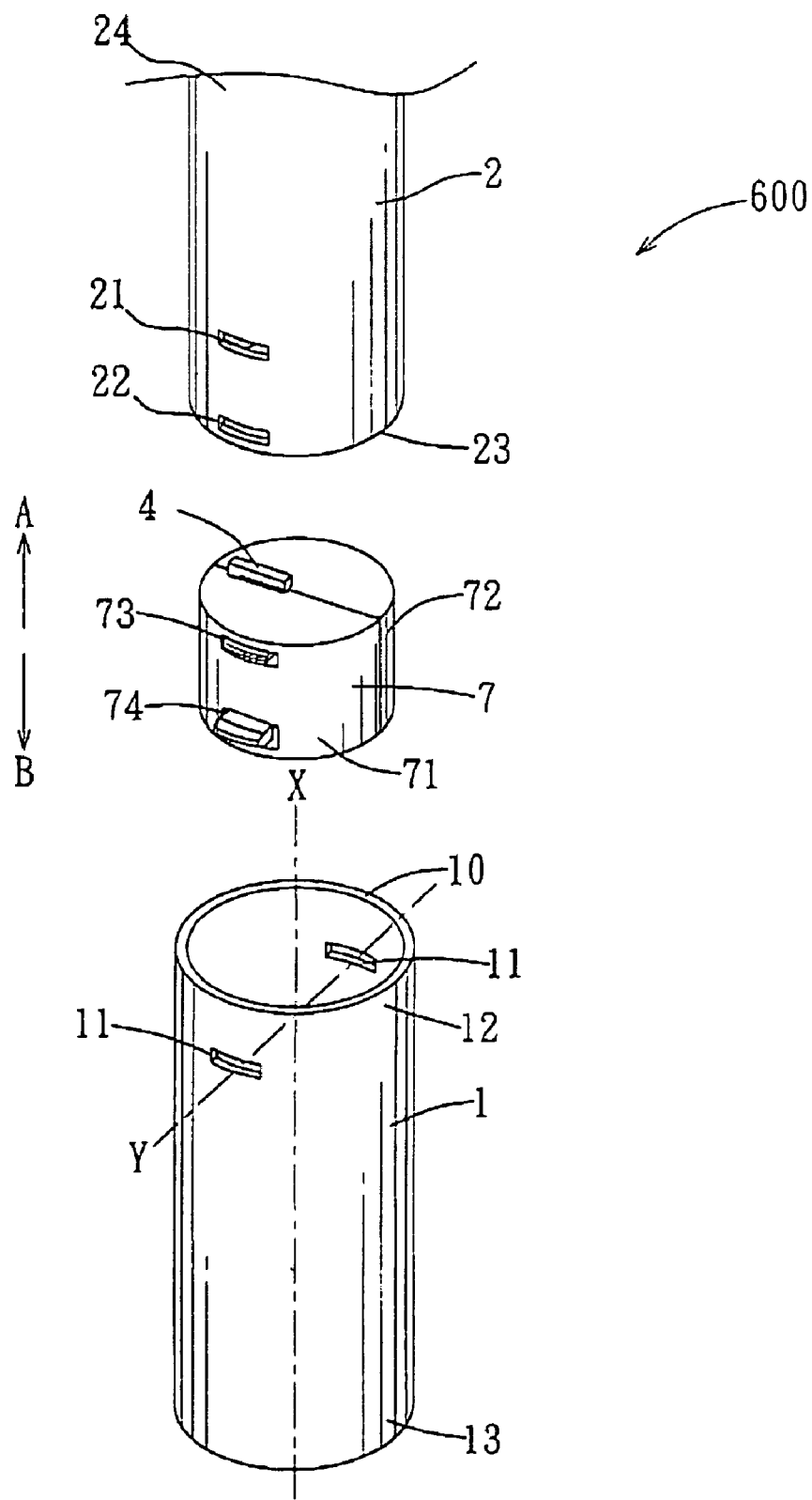
FIG. 3 is a fragmentary partly exploded perspective view of the preferred embodiment of a telescopic adjusting mechanism according to the present invention.
Figure 4:
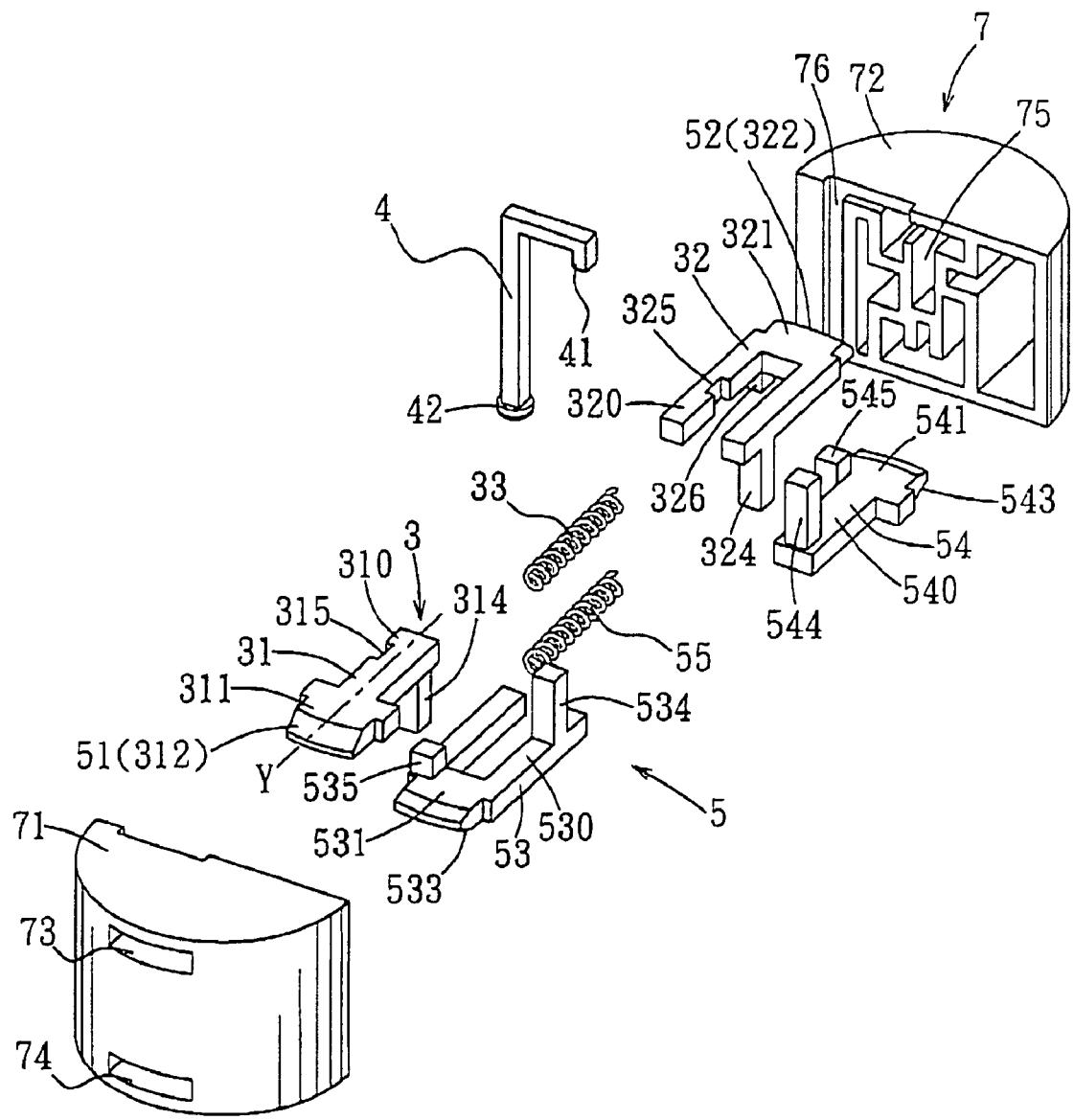
FIG. 4 is an exploded perspective view of a locking unit, a restraining member, and a drive unit of the preferred embodiment.
Figure 5:
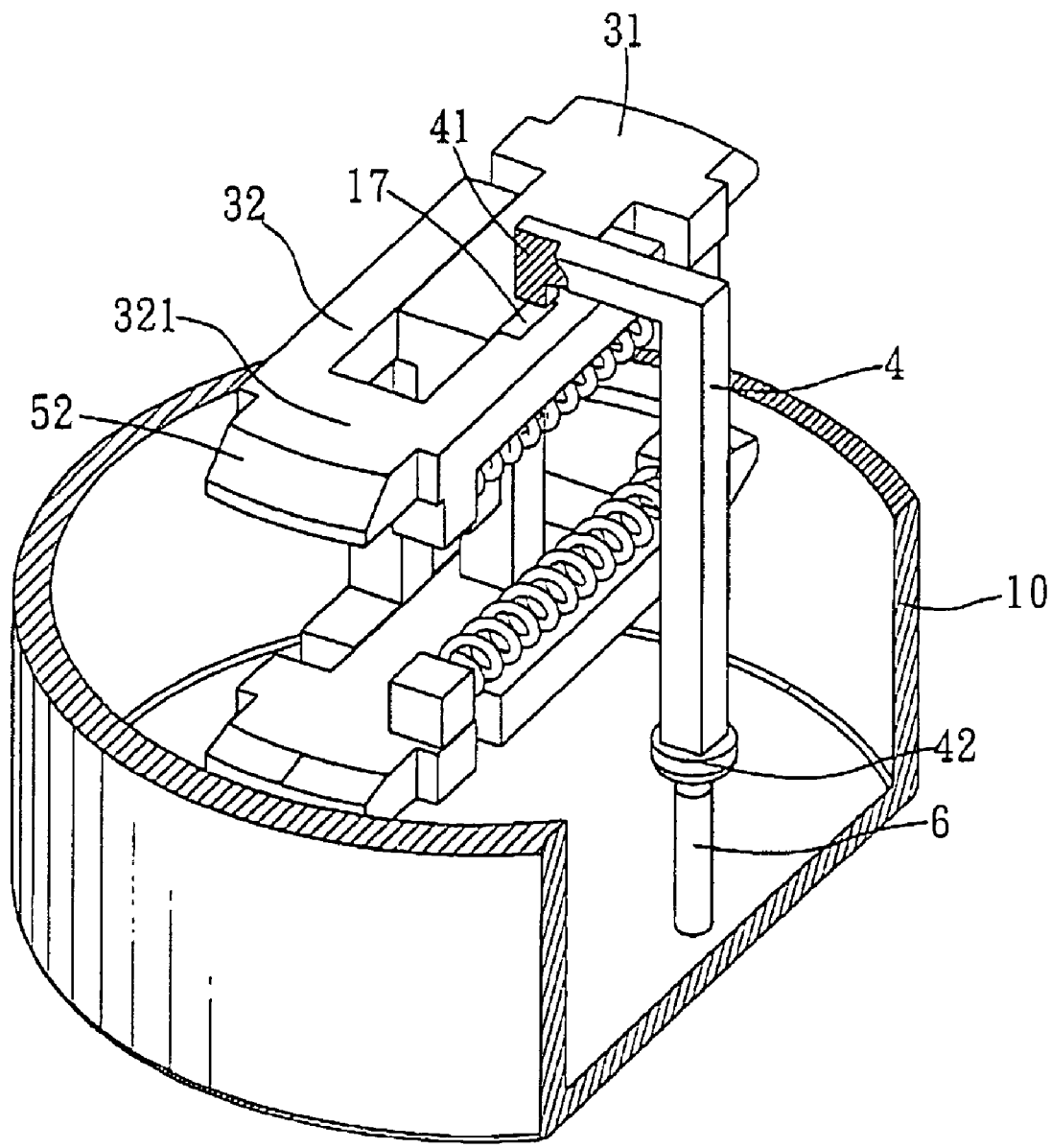
FIG. 5 is a fragmentary perspective view of the preferred embodiment, illustrating an initial state of the telescopic adjusting mechanism.
Figure 16:
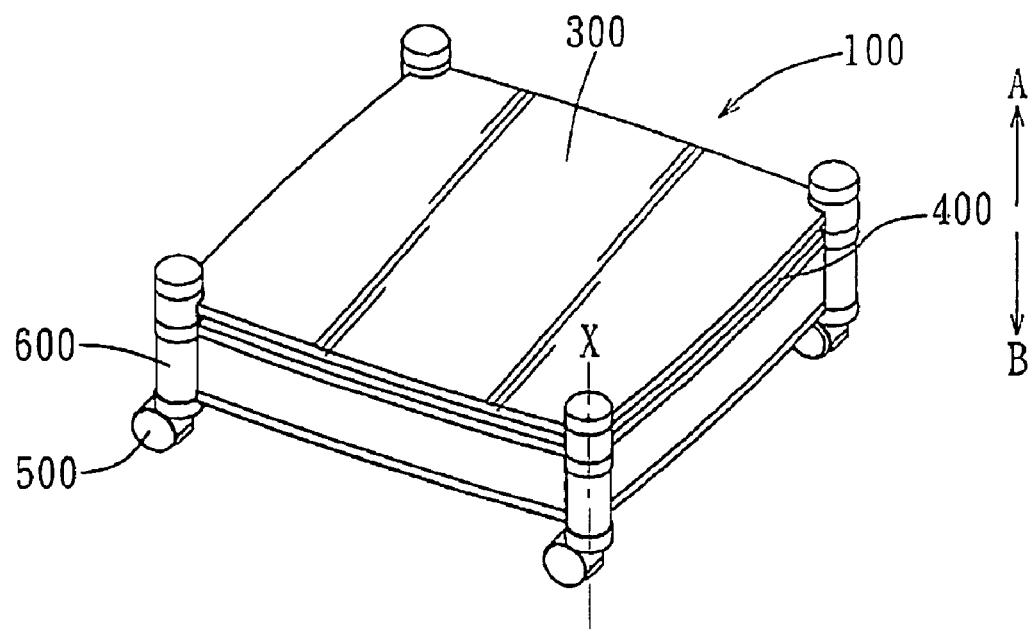
FIG. 16 is a perspective view of a support stand incorporating four of the telescopic adjusting mechanisms according to the preferred embodiment of the present invention, at the support stand being in a non-extended state.
Figure 17:
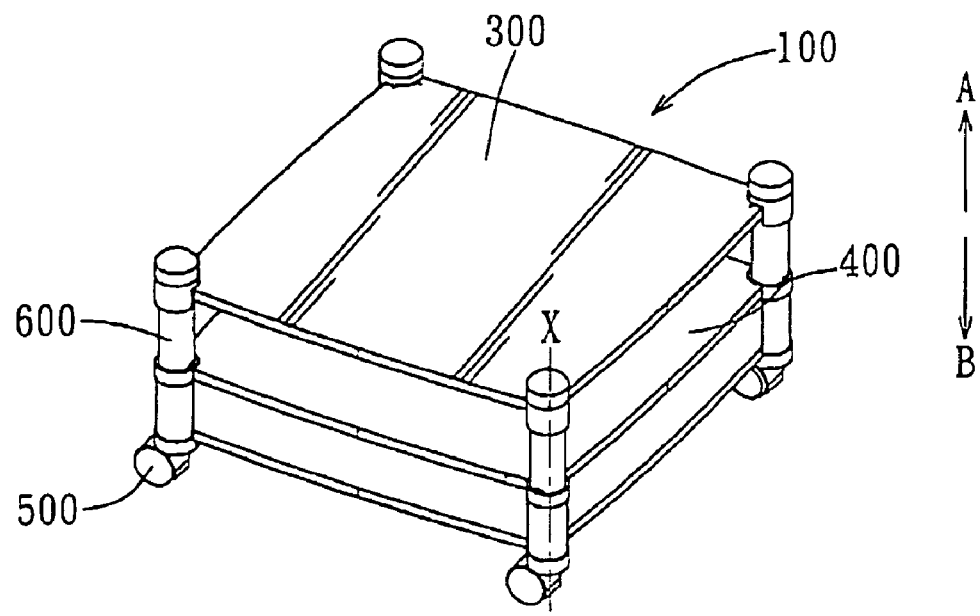
FIG. 17 is a view similar to FIG. 16, but illustrating the support stand in an extended state.

With reference to FIGS. 3 4, and 5, the preferred embodiment of a telescopic adjusting mechanism 600 of this invention includes an outer tube 1, an inner tube 2, a locking unit 3, a restraining member 4, a drive unit 5, a releasing member 6, and an inner housing 7. As shown in FIG. 16 and FIG. 17, the telescopic adjusting mechanism 600 of the present invention is adapted for incorporation into a support stand 100 for an office automation machine, such as a printer, a copying machine, etc. The support stand 100 includes a first plate 300, a second plate 400, four rollers 500, and four of the telescopic adjusting mechanisms 600 for connecting the first and second plates 300, 400 at four corners thereof. The telescopic adjusting mechanisms 600 facilitate height adjustment of the support stand 100 such that the office automation machine can be operated at a suitable height.

It should be noted herein that in FIG. 5 to FIG. 15, the inner housing 7 is omitted so as to better illustrate operations of other components of the telescopic adjusting mechanism 600 of the present invention.

With reference to FIG. 3, FIG. 4, FIG. 16 and FIG. 17, the outer tube 1 is provided with two positioning units 11, and has opposite first and second ends 12, 13 along a longitudinal axis (X). In this embodiment, the outer tube 1 has a tube wall 10, and each of the positioning units 11 is a positioning hole 11 formed in the tube wall 10. In particular, the positioning holes 11 are disposed opposite to each other along a transverse axis (Y) perpendicular to the longitudinal axis (X). The first end 12 of the outer tube 1 of each of the telescopic adjusting mechanisms 600 is adapted to be connected to a corresponding corner of the second plate 400 of the support stand 100, and the second end 13 of the outer tube 1 is adapted to be connected to a corresponding one of the rollers 500.

The inner tube 2 is extended into the outer tube 1 via the first end 12, is formed with two first holes 21 (only one of which is visible in FIG. 3), and is displaceable relative to the outer tube 1 along the longitudinal axis (X). It should be noted herein that the inner tube 2 and the outer tube 1 have suitable dimensions that facilitate smooth displacement of the inner tube 2 relative to the outer tube 1. Since the crucial feature of the present invention does not reside in this aspect, further details of the same are omitted herein for the sake of brevity.

In this embodiment, each of the first holes 21 is aligned with a corresponding one of the positioning holes 11 in the tube wall 10 of the outer tube 1 along the longitudinal axis (X). In addition, the inner tube 2 is further formed with two second holes 22 (only one of which is visible in FIG. 3), each of which s opposite to a corresponding one of the first holes 21 along the transverse axis (Y) and is staggered with the corresponding one of the first holes 21 along the longitudinal axis (X). The inner tube 2 has third and fourth ends 23, 24 opposite to each other along the longitudinal axis (X). The fourth end 24 of the inner tube 2 of each of the telescopic adjusting mechanisms 600 is adapted to be connected to the first plate 300 of the support stand 100.

Figure 8:
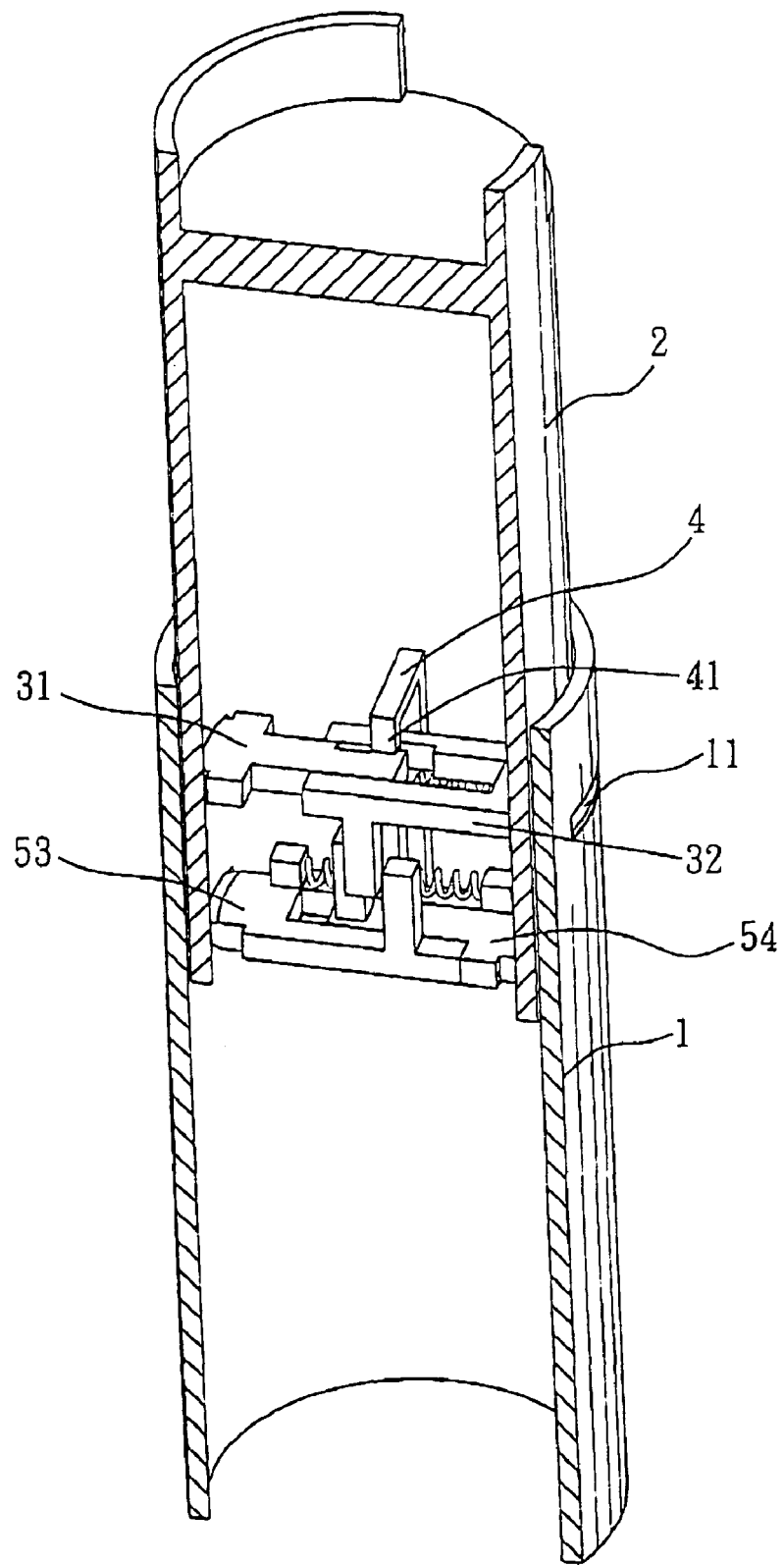
FIG. 8 is a fragmentary partly cutaway view of the preferred embodiment, illustrating the locking members disposed at a locking position.
Figure 9:
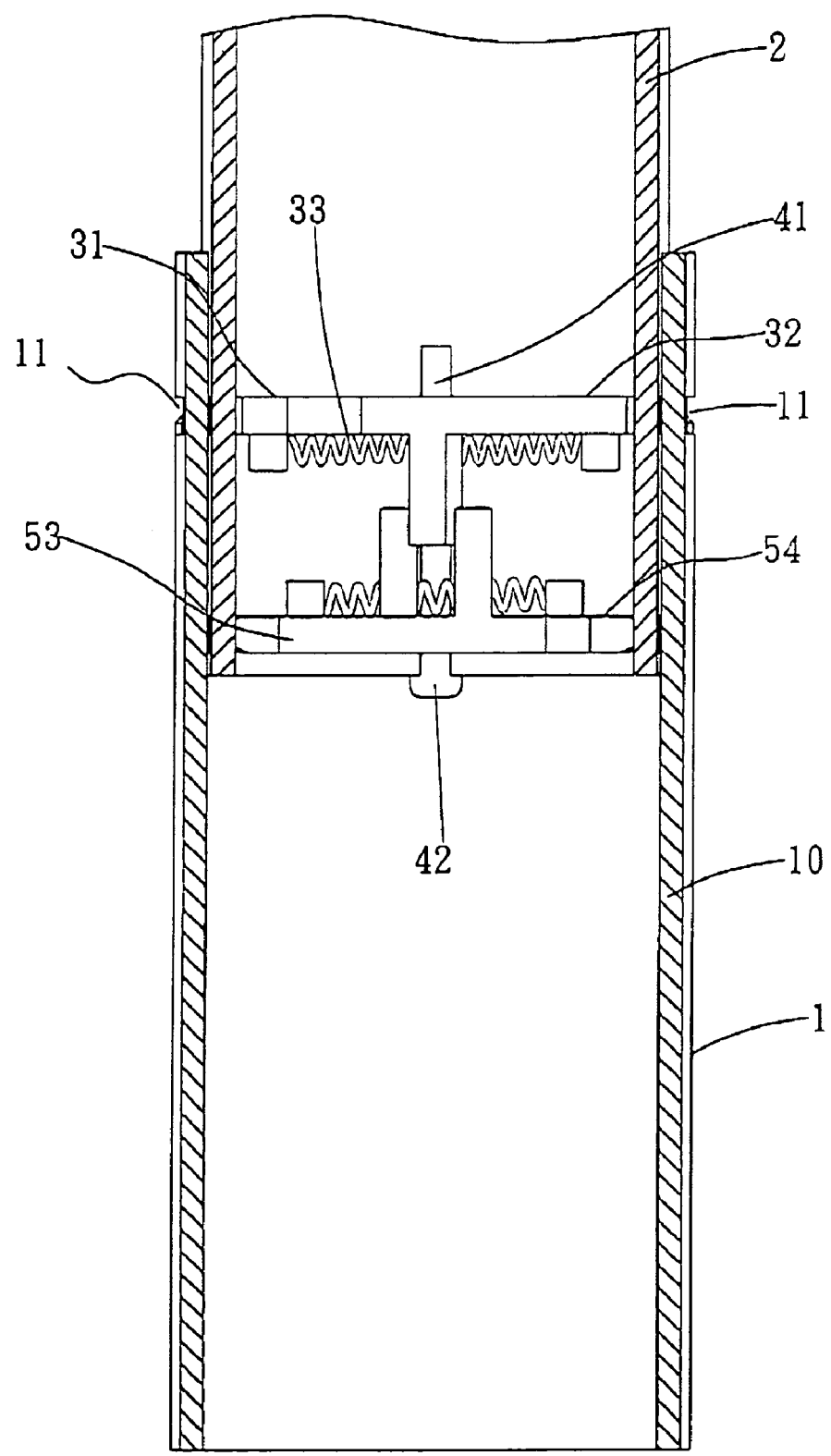
FIG. 9 is a fragmentary sectional view of the preferred embodiment corresponding to FIG. 8.
Figure 10:
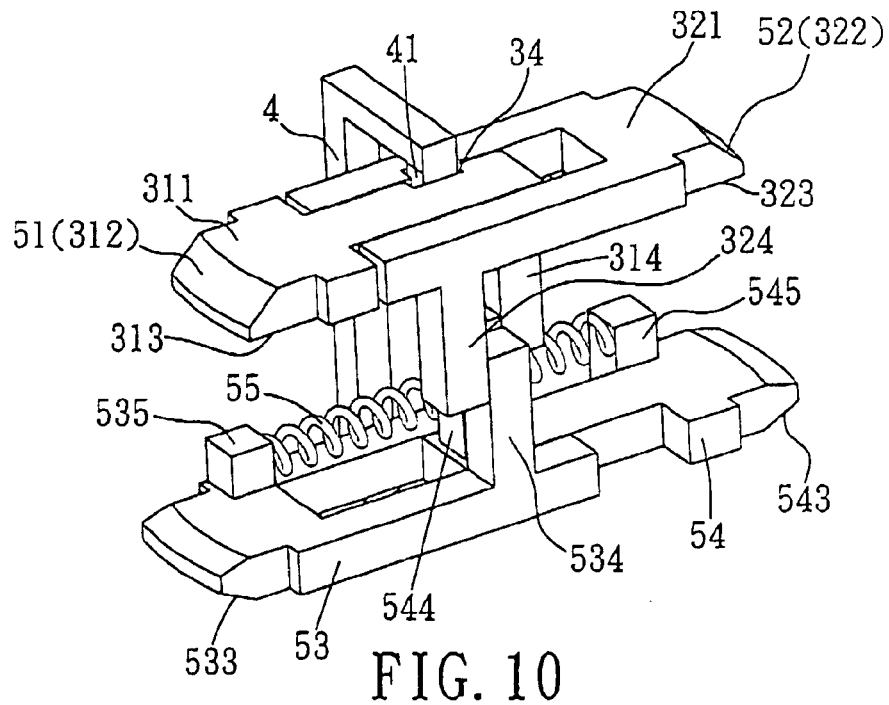
FIG. 10 is an assembled perspective view of the locking unit, the restraining member, and the drive unit of the preferred embodiment when the locking unit is disposed at an unlocking position.
Figure 11:
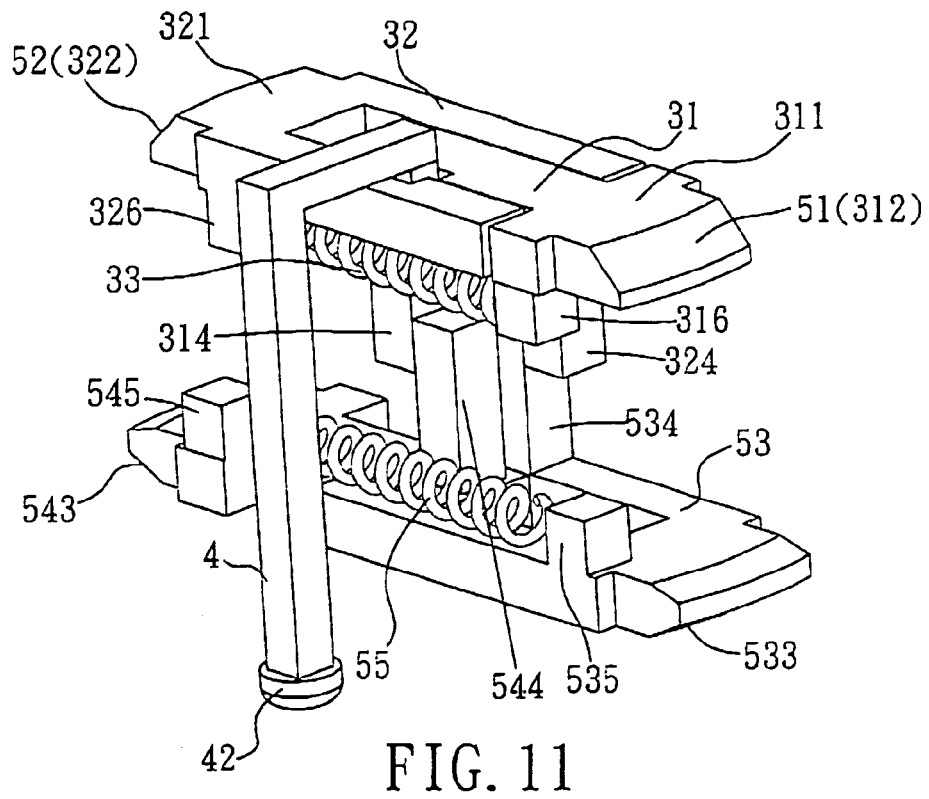
FIG. 11 is a view similar to FIG. 10 taken from a different angle.

The locking unit 3 is disposed in the inner tube 2, is displaceable relative to the outer tube 1 along with the inner tube 2, and includes two locking members 31, 32 and a first biasing member 33. Each of the locking members 31, 32 is movable along the transverse axis (Y) between a locking position (as shown in FIG. 8 and FIG. 9), where each of the locking members 31, 32 extends through a corresponding one of the first holes 21 in the inner tube 2 to engage a corresponding one of the positioning units 11 of the outer tube 1 such that the inner tube 2 is disposed at an extended position relative to the outer tube 1, and an unlocking position (as shown in FIGS. 10, 11, 12 and 13), where each of the locking members 31, 32 is disengaged from the corresponding one of the positioning units 11. The locking unit 3 is formed with an engaging member 34 (as shown in FIG. 10). The first biasing member 33 biases the locking members 31, 32 to the locking position. The first biasing member 33 is a compression spring in this embodiment, but may be other elastic devices in other embodiments of the present invention.

In this embodiment, the engaging member 34 of the locking unit 3 is in the form of an engaging hole 34. In addition, each of the locking members 31, 32 has a main body 310, 320 that is formed with an indentation 315, 325. The indentations 315, 325 of the locking members 31, 32 cooperate to form the engaging hole 34 when the locking members 31, 32 are disposed at the unlock in a position. The main body 310, 320 of one of the locking members 31, 32 is substantially T-shaped, and the main body 310, 320 of the other one of the locking members 31, 32 is substantially U-shaped for receiving slidably the T-shaped main body. In particular, the main body 310 of the locking member 31 is substantially T-shaped, and the main body 320 of the locking member 32 is substantially U-shaped. Furthermore, each of the locking members 31, 32 has a locking part 311, 321, a first contact portion 314, 324, and a first stop protrusion 316, 326. The locking part 311, 321 of each of the locking members 31, 32 is connected to the main body 310, 320, and engages the corresponding one of the positioning holes 11 when the locking members 31, 32 are disposed at the locking position. The first biasing member 33 is disposed between the first stop protrusions 316, 326 of the locking members 31, 32.

The restraining member 4 is disposed in the inner tube 2, and engages releasably the engaging member 34 of the locking unit 3 when the locking members 31, 32 are disposed at the unlocking position so as to prevent the locking unit 3 from hindering retraction of the inner tube 2 into the outer tube 1.

In this embodiment, the restraining member 4 has a first terminal part 41 and a second terminal part 42. The first terminal part 41 is received releasably in the engaging member (or engaging hole 34) when the locking members 31, 32 are disposed at the unlocking position.

Figure 6:
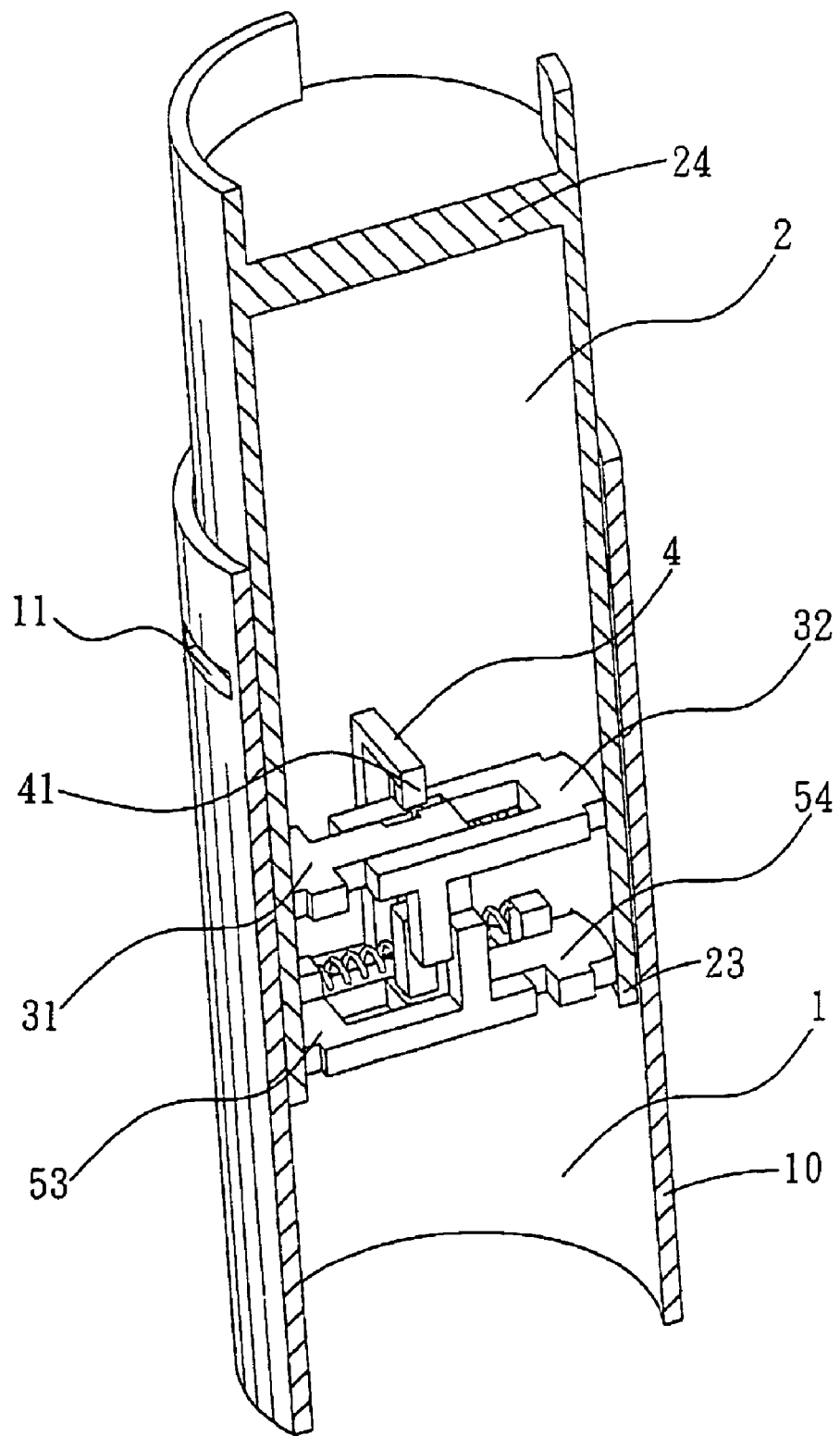
FIG. 6 is a fragmentary partly cutaway view of the preferred embodiment, illustrating locking members of the locking unit disposed at an intermediate position, and pull members of the drive unit disposed at a disengaging position.
Figure 7:
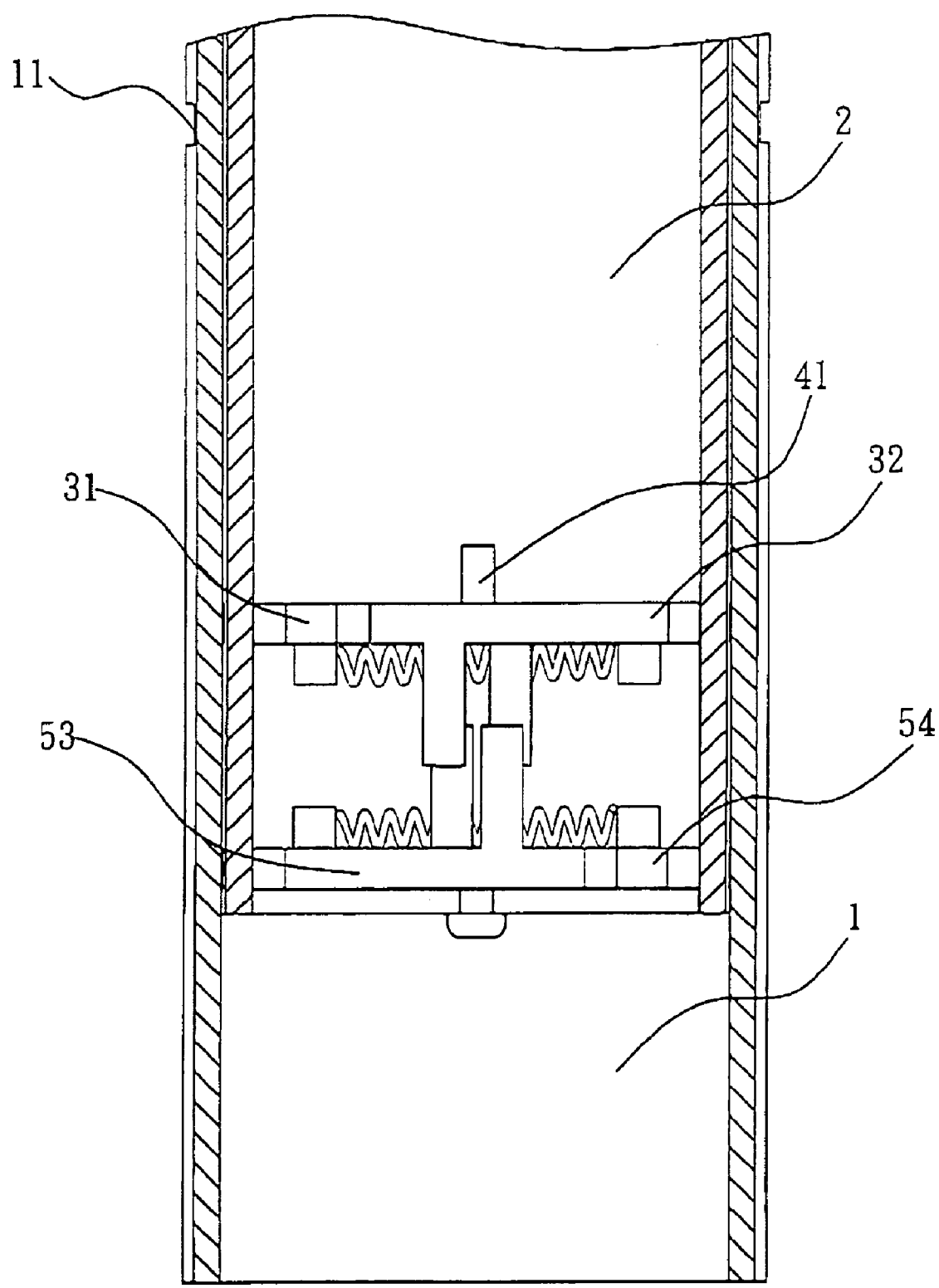
FIG. 7 is a fragmentary sectional view of the preferred embodiment corresponding to FIG. 6.

Moreover, each of the locking members 31, 32 is further movable to an intermediate position (as shown in FIG. 6 and FIG. 7) between the locking position (as shown in FIG. 8 and FIG. 9) and the unlocking position (as shown in FIGS. 10-13). Each of the locking members 31, 32 is disengaged from the corresponding one of the positioning units 11 of the outer tube 1 and the restraining member 4 is unable to engage the engaging member 34 when the locking members 31, 32 are disposed at the intermediate position.

The drive unit 5 is associated operably with the locking members 31, 32, and is operable to move the locking members 31, 32 from the locking position to the unlocking position against biasing action of the first biasing member 33. The drive unit 5 includes two guiding members 51, 52, each of which guides movement of a corresponding one of the locking members 31, 32 from the locking position to the intermediate position, and two pull members 53, 54, each of which pulls a corresponding one of the locking members 32, 31 to move from the intermediate position to the unlocking position. The drive unit 5 further includes a second biasing member 55 for biasing the pull members 53, 54 to the engaging position. The second biasing member 55 is a compression spring in this embodiment, but may be other elastic devices in other embodiments of the present invention.

In this embodiment, each of the guiding members 51, 52 of the drive unit 5 is a first slanted surface 312, 322 formed on the locking part 311, 321 of the corresponding one of the locking members 31, 32 for guiding movement of the corresponding one of the locking members 31, 32 from the locking position to the intermediate position when the inner tube 2 is displaced relative to the outer tube 1 from the extended position in a first direction (A) along the longitudinal axis (X). The locking part 311, 321 of each of the locking members 31, 32 is further formed with a first flat surface 313, 323 (see FIG. 10) opposite to the first slanted surface 312, 322. The first flat surfaces 313, 323 of the locking members 31, 32 prohibit displacement of the inner tube 2 relative to the outer tube 1 from the extended position in a second direction (B) along the longitudinal axis (X) opposite to the first direction (A). Preferably, the first slanted surfaces 312, 322 of the locking members 31, 32 have identical lengths and slanting angles.

Figure 12:
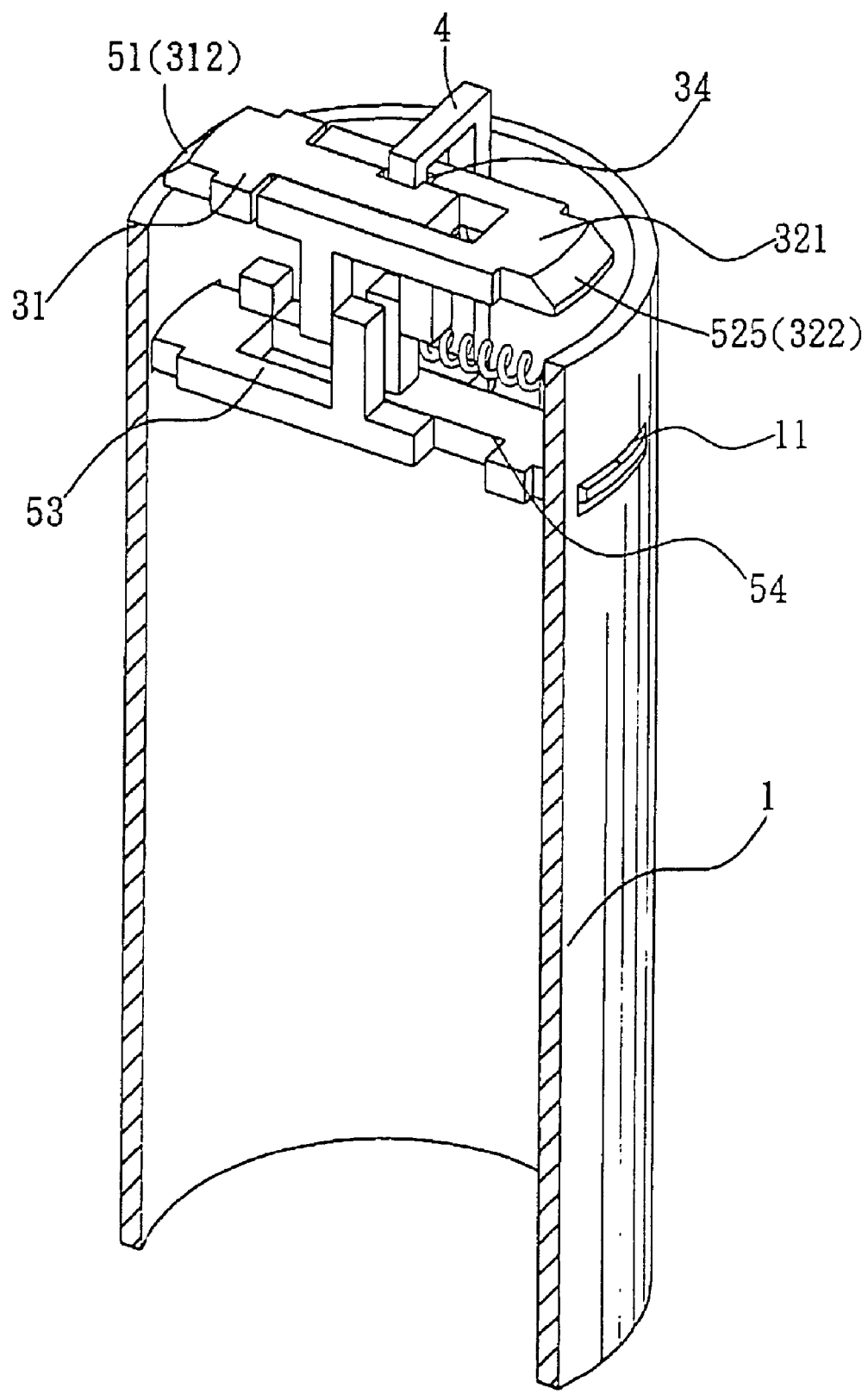
FIG. 12 is a fragmentary partly cutaway view of the preferred embodiment, illustrating the locking members disposed at the unlocking position, and the pull members disposed at an engaging position.
Figure 13:
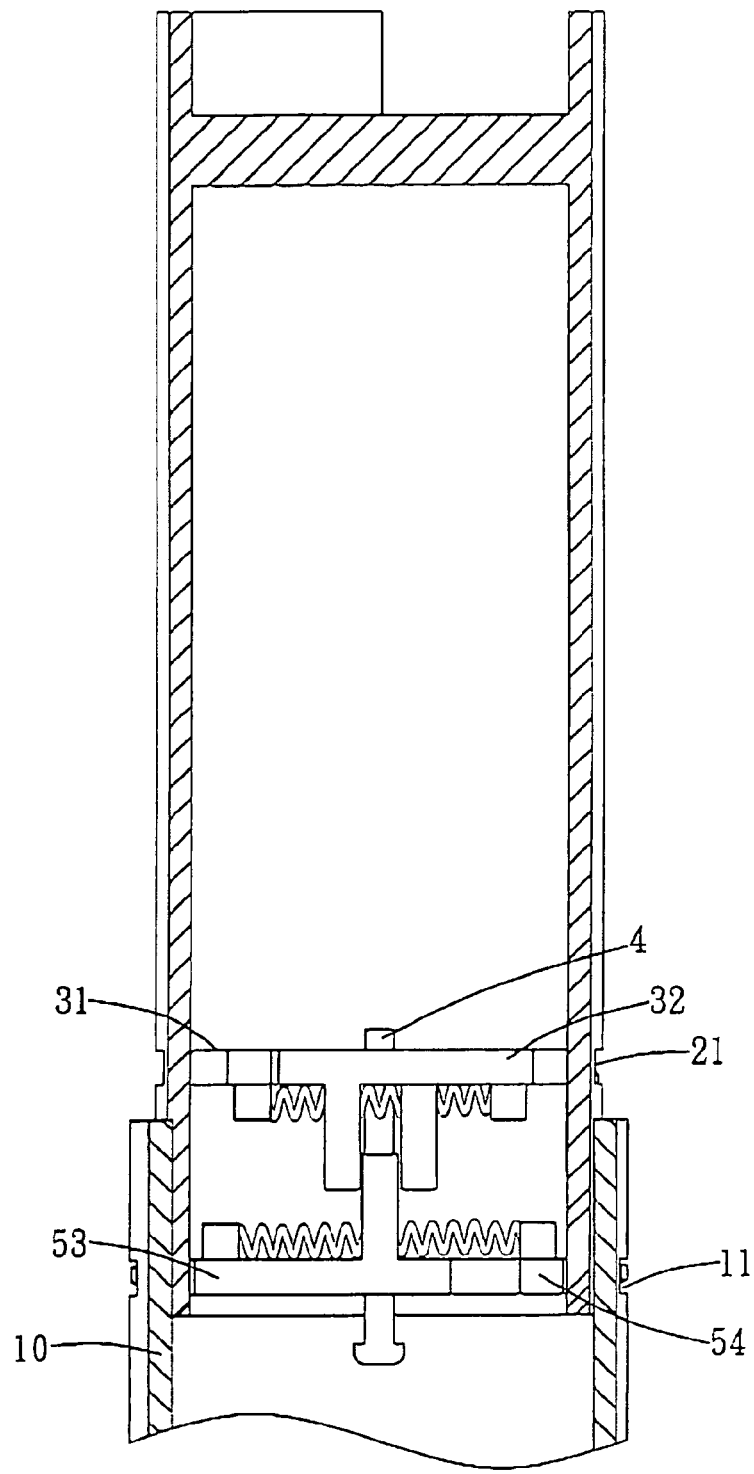
FIG. 13 is a fragmentary sectional view of the preferred embodiment corresponding to FIG. 12.
Figure 14:
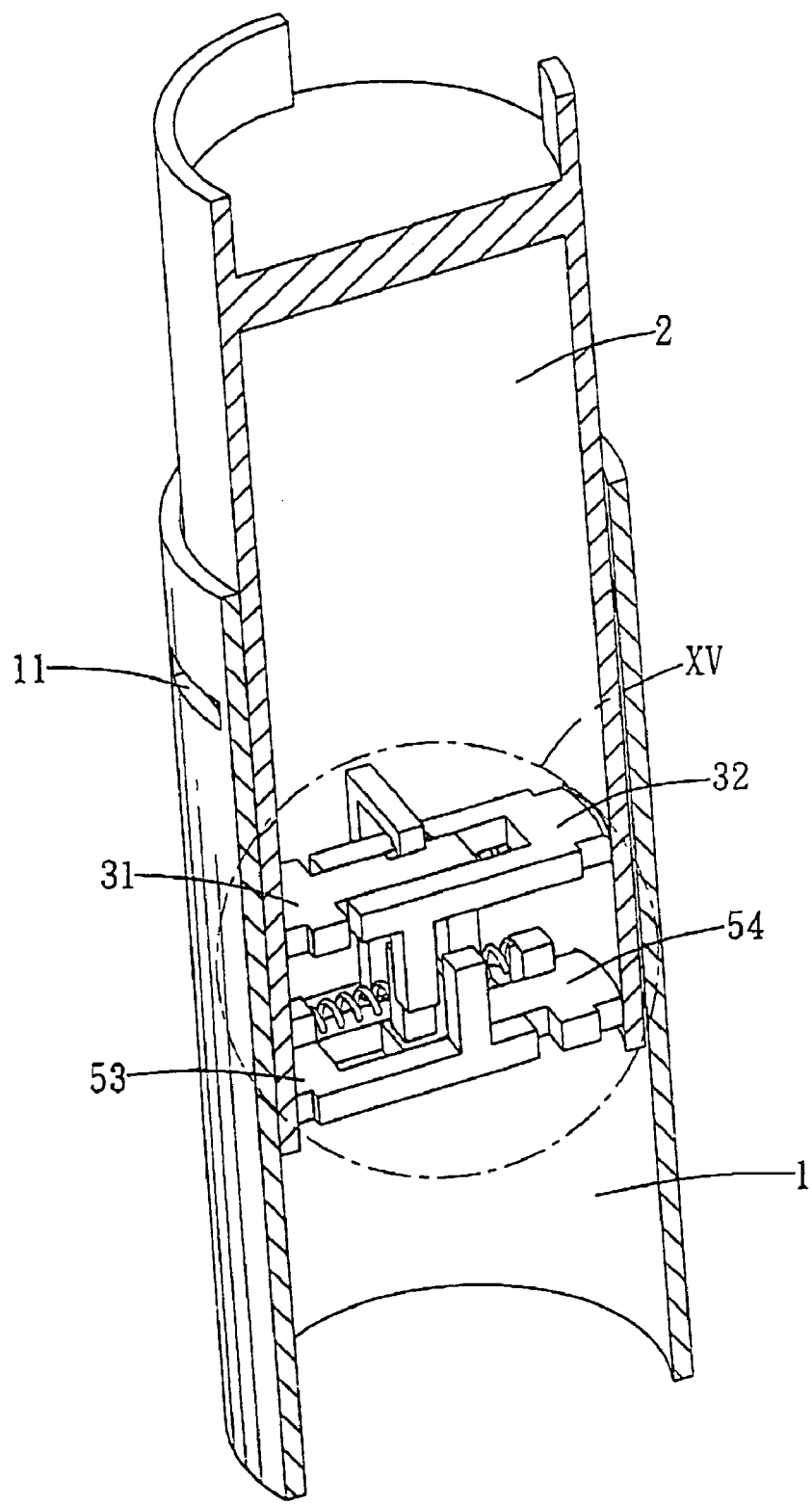
FIG. 14 is a fragmentary partly cutaway view of the preferred embodiment, illustrating the locking members disposed at the unlocking position, and the pull members disposed at the disengaging position.
Figure 15:
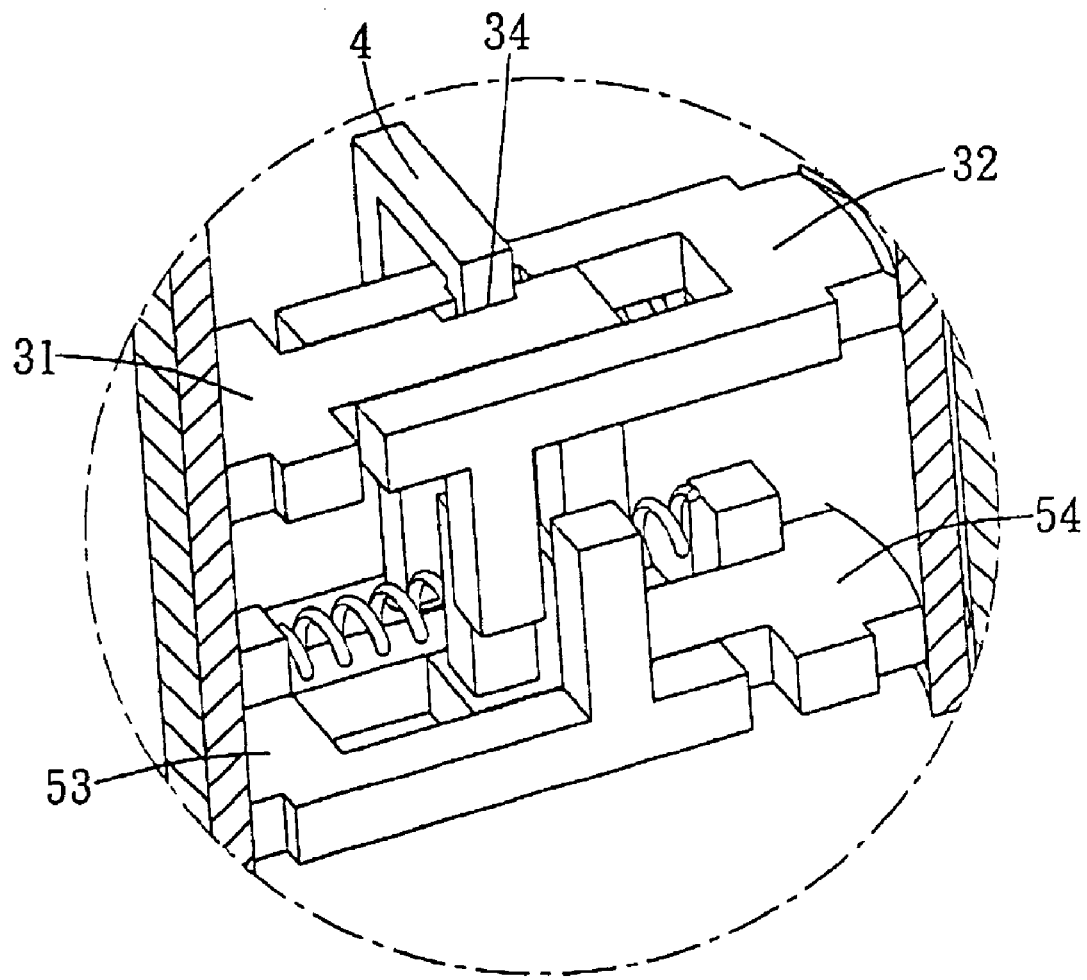
FIG. 15 is a magnified enlarged view of an encircled portion XV in FIG. 14.

In this embodiment, each of the pull members 53, 54 of the drive unit 5 is movable along the transverse axis (Y) between an engaging position (as shown in FIG. 12 and FIG. 13), where each of the pull members 53, 54 extends through a corresponding one of the second holes 22 in the inner tube 2 to engage a corresponding one of the positioning holes 11 in the tube wall 10 of the outer tube 1 and pulls the corresponding one of the locking members 32, 31 from the intermediate position to the unlocking position, and a disengaging position (as shown in FIG. 6 and FIG. 7), where each of the pull members 53, 54 is disengaged from the corresponding one of the positioning holes 11.

In particular, each of the pull members 53, 54 has an engaging part 531, 541 that engages releasably the corresponding one of the positioning holes 11. The engaging part 531, 541 has a second slanted surface 533, 543 for guiding movement of the pull member 53, 54 from the engaging position to the disengaging position when the inner tube 2 is displaced relative to the outer tube 1 in the second direction (B) along the longitudinal axis (X). Preferably, the second slanted surfaces 533, 543 of the pull members 53, 54 have identical lengths and slanting angles.

Each of the pull members 53, 54 has a second contact portion 534, 544 disposed between the locking part 321, 311 and the first contact portion 324, 314 of the corresponding one of the locking members 32, 31 along an axis parallel to the transverse axis (Y). The second contact portion 534, 544 is spaced apart from the first contact portion 324, 314 of the corresponding one of the locking members 31, 32 when the pull member 53, 54 is disposed at the disengaging position, and is in contact with the first contact portion 324, 314 of the corresponding one of the locking members 32, 31 for pulling the corresponding one of the locking members 32, 31 to move from the intermediate position to the unlocking position when the pull member 53, 54 is disposed at the engaging position. In particular, the second contact portion 534 of the pull member 53 is in contact with the first contact portion 324 of the locking member 32 for pulling the locking member 32 to move from the intermediate position to the unlocking position when the pull member 53 is disposed at the engaging position, and the second contact portion 544 of the pull member 54 is in contact with the first contact portion 314 of the locking member 31 for pulling the locking member 31 to move from the intermediate position to the unlocking position when the pull member 54 is disposed at the engaging position.

In this embodiment, each of the pull members 53, 54 has a main body 530, 540 and a second stop portion 535, 545. The main body 530, 540 of one of the pull members 53, 54 is substantially T-shaped, while the main body 530, 540 of the other one of the pull members 53, 54 is substantially U-shaped for receiving slidably the T-shaped main body. In particular, the main body 530 of the pull member 53 is substantially U-shaped, and the main body 540 of the pull member 54 is substantially U-shaped. The engaging part 531, 541, the second contact portion 534, 544, and the second stop portion 535, 545 are connected to the main body 530, 540. The second biasing member 55 is disposed between the second stop portions 535, 545 of the pull members 53, 54.

The releasing member 6 is capable of disengaging the restraining member 4 from the engaging member 34 of the locking unit 3. In this embodiment, the releasing member 6 is a projection provided in the second end 13 of the outer tube 1 and aligned with the second terminal part 42 of the restraining member 4. The releasing member 6 stops co-displacement of the restraining member 4 with the locking unit 3 relative to the outer tube 1 when the releasing member 6 comes into contact with the second terminal part 42 of the restraining member 4 such that the first terminal part 41 is disengaged from the engaging hole 34 upon retraction of the inner tube 2 into the outer tube 1.

The inner housing 7 retains the locking unit 3, the restraining member 4, and the drive unit 5 at least partially therein, and is disposed in the third end 23 of the inner tube 2. The inner housing 7 is formed with two third holes 73 and two fourth holes 74, and includes first and second housing halves 71, 72. One of the third holes 73 and one of the fourth holes 74 are formed in the first housing half 71, while the other one of the third holes 73 and the other one of the fourth holes 74 are formed in the second housing half 74 (not visible in FIG. 3 and FIG. 4). The third hole 73 in each of the first and second housing halves 71, 72 is registered with a corresponding one of the first holes 21 in the inner tube 2, while the fourth hole 74 in each of the first and second housing halves 71, 72 is registered with a corresponding one of the second holes 22 in the inner tube 2. Each of the locking members 31, 32 extends through a corresponding one of the third holes 73 in the inner housing 7 and the corresponding one of the first holes 21 in the inner tube 2 to engage the corresponding one of the positioning holes 11 in the tube wall 10 of the outer tube 1 when the locking member 31, 32 is disposed at the locking position. Each of the pull members 53, 54 extends through a corresponding one of the fourth holes 74 in the inner housing 7 and the corresponding one of the second holes 22 in the inner tube 2 to engage the corresponding one of the positioning holes 11 in the tube wall 10 of the outer tube 1 when the pull member 53, 54 is disposed at the engaging position.

Preferably, the first and second housing halves 71, 72 of the inner housing 7 are formed with grooves 75 to facilitate smooth sliding action of the locking members 31, 32 and the pull members 53, 54 therein during operation. The inner housing 7 is further formed with an open-ended groove 76 for retaining slidably the restraining member 4 therein. The first and second terminal parts 41, 42 extend outside the open-ended groove 76 and are visible from the inner tube 9.

With reference to FIG. 3 and FIG. 5, at an initial state of the telescopic adjusting mechanism 600, the inner tube 2 is disposed at a retracted position, where the inner tube 2 is retracted into the outer tube 1 and the releasing member 6 and the second terminal part 42 of the restraining member 4 are in contact with each other. At this time, the locking members 31, 32 are disposed at the intermediate position, where the locking parts 311, 312 of the locking members 31, 32 are extended through the third holes 73 in the inner housing 7 and abut against the tube wall 10 of the outer tube 1 due to biasing action of the first biasing member 33, and the pull members 53, 54 are disposed at the disengaging position, where the engaging parts 531, 541 of the pull members 53, 54 are extended through the fourth holes 74 in the inner housing 7, and abut against the tube wall 10 of the outer tube 1 due to biasing action of the second biasing member 55. With reference to FIG. 16, the support stand 100 incorporating the present invention is disposed at a non-extended state at this moment.

With reference to FIG. 3, FIG. 4, FIG. 6 and FIG. 7, when a user wishes for the support stand 100 (refer to FIG. 16 and FIG. 17) to be disposed at an extended state, i.e., to have a greater height, the first plate 300 is pulled in the first direction (A) along the longitudinal axis (X), thereby moving the inner tube 2, the locking unit 3, the restraining member 4 and the drive unit 5 together relative to the outer tube 1 in the first direction (A). Although the releasing member 6 and the second terminal part 42 of the restraining member 4 are no longer in contact with each other, due to the biasing action of the first biasing member 33, the locking members 31, 32 are biased toward the locking position, such that the indentations 315, 325 in the main bodies 310, 320 of the locking members 31, 32 do not cooperate to form the engaging hole 34. Consequently, the first terminal part 41 of the restraining member 4 is unable to engage the engaging hole 34, and rests on top of the locking members 31, 32.

As shown in FIG. 3, FIG. 4, FIG. 8 and FIG. 9, as the inner tube 2 is moved further in the first direction (A) relative to the outer tube 1 until each of the first holes 21 in the inner tube 2, and the corresponding one of the third holes 73 in the inner housing 7 are aligned with the corresponding one of the positioning holes 11 in the tube wall 10 of the outer tube 1, each of the locking members 31, 32 is moved from the intermediate position to the locking position, where the locking part 311, 321 of each locking member 31, 32 extends through the corresponding one of the third holes 73 and the corresponding one of the first holes 21 to engage the corresponding one of the positioning holes 11, so as to dispose the inner tube 2 at the extended position relative to the outer tube 1. Since the locking part 311, 321 of each of the locking members 31, 32 is formed with the first flat surface 313, 323 (refer to FIG. 10) displacement of the inner tube 2 relative to the outer tube 1 from the extended position in the second direction (B) along the longitudinal axis (X) opposite to the first direction (A) is prohibited. Referring to FIG. 17, at this time, the support stand 100 is disposed at an extended state, where the first plate 300 is spaced apart from the second plate 400, and is able to bear load thereon.

When it is desired to place the support stand 100 back to the non-extended state, it is first required that the inner tube 2 be moved relative to the outer tube 1 in the first direction (A) from the extended position. Due to the presence of the guiding members 51, 52 of the drive unit 5 in the form of the first slanted surfaces 312, 322 formed on the locking parts 311, 321 of the locking members 31, 32, as the inner tube 2 is displaced relative to the outer tube 1 from the extended position in the first direction (A), each of the locking parts 311, 321 is guided along an edge of the corresponding one of the positioning holes 11 inwardly toward the inner tube 2, thereby moving the locking members 31, 32 from the locking position to the intermediate position.

With reference to FIG. 3, FIG. 4, FIG. 12 and FIG. 13, the inner tube 2 is moved relative to the outer tube 1 in the first direction (A) until each of the second holes 22 in the inner tube 2 and the corresponding one of the fourth holes 74 in the inner housing 7 are aligned with the corresponding one of the positioning holes 11 in the tube wall 10 of the outer tube 1. At this time, due to the biasing action of the second biasing member 55 of the drive unit 5, the pull members 53, 54 are moved from the disengaging position to the engaging position, such that the engaging part 531, 541 of each of the pull members 53, 54 extends through the corresponding one of the fourth holes 74 and the corresponding one of the second holes 22 to engage the corresponding one of the positioning holes 11. With the pull members 53, 54 moving to the engaging position, the second contact part 534, 544 of each of the pull members 53, 54 is brought into contact with the first contact part 324, 314 of the corresponding one of the locking members 32, 31, thereby pulling the corresponding one of the locking members is 32, 31 to move from the intermediate position to the unlocking position against biasing action of the first biasing member 33. In particular, the second contact part 534 of the pull member 53 is brought into contact with the first contact part 324 of the locking member 32, thereby pulling the locking member 32 to move from the intermediate position to the unlocking position. On the other hand, the second contact part 544 of the pull member 54 is brought into contact with the first contact part 314 of the locking member 31, thereby pulling the locking member 31 to move from the intermediate position to the unlocking position. At this time, the indentations 315, 325 formed in the main bodies 310, 320 of the locking members 31, 32 cooperate to form the engaging hole 34. By virtue of gravity, the first terminal part 41 of the restraining member 4 falls into the engaging hole 34, thereby preventing movement of the locking members 31, 32 from the unlocking position back to the locking position. Consequently, the locking unit 3 is prevented from hindering retraction of the inner tube 2 into the outer tube 1. At this time, the inner tube 2 is ready to be retracted into the outer tube 1.

Referring to FIG. 3, FIG. 4, FIG. 14 and FIG. 15, with the locking members 31, 32 disposed (and retained) at the unlocking position, to complete the operation of placing the support stand 100 back to the non-extended state, the inner tube 2 is moved relative to the outer tube 1 in the second direction (B) to the retracted position. Due to the presence of the second slanted surfaces 533, 543 of the pull members 53, 54, as the inner tube 2 is displaced relative to the outer tube 1 in the second direction (B), each of the engaging parts 531, 541 is guided along an edge of the corresponding one of the positioning holes 11 inwardly toward the inner tube 2, thereby moving the pull members 53, 54 from the engaging position to the disengaging position.

With reference to FIG. 3, FIG. 4 and FIG. 5, the inner tube 2 is displaced relative to the outer tube 1 in the second direction (B) until the second terminal part 42 of the restraining member 4 is brought into contact with the releasing member 6, such that the releasing member 6 stops co-displacement of the restraining member 4 with the locking unit 3 relative to the outer tube 1 and such that the first terminal part 41 of the restraining member 4 is disengaged from the engaging hole 34 in the locking unit 3. Due to the disengagement of the first terminal part 41 from the engaging hole 34, and due to the biasing action of the first biasing member 33, the locking members 31, 32 are moved from the unlocking position back to the intermediate position. At this time, the inner tube 2 is disposed at the retracted position, and the telescopic adjusting mechanism 600 is disposed back at the initial state.

It should be noted herein that although the first contact portions 314, 324 of the locking members 31, 32 and the second contact portions 534, 544 of the pull members 53, 54 are illustrated as projections on the main bodies 310, 320, 530, 540 in this embodiment, they may take other forms as long as the second contact portions 534, 544 are able to come into contact with the first contact portions 314, 324 for moving the locking members 31, 32 from the intermediate position to the unlocking position.

It should be further noted herein that the releasing member 6 may be omitted in other embodiments of the present invention by making the restraining member 4 extend further out of the open-ended groove 76 in the inner housing 7, such that the second end 13 of the outer tube 1 itself stops co-displacement of the restraining member 4 with the locking unit 3 relative to the outer tube 1 in the second direction (B) and such that the first terminal part 41 of the restraining member 4 is disengaged from the engaging hole 34 in the locking unit 3 when the second terminal part 42 of the restraining member 4 comes into contact with the second end 13 of the outer tube 1.

Furthermore, the first and second slanted surfaces 312, 322, 533, 543 may be curved surfaces in other embodiments of the present invention, while achieving the same effects. In addition, other than compression springs, the first and second biasing members 33, 55 may be highly-resilient elastic plates in other embodiments of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A telescopic adjusting mechanism comprising:
an outer tube comprising a tube wall provided with a pair of opposing positioning holes, and having opposite first and second ends along a longitudinal axis;
an inner tube extended into said outer tube via said first end, comprising a tube wall formed with a pair of opposing first holes, and displaceable relative to said outer tube along the longitudinal axis;
a locking unit disposed in said inner tube, displaceable relative to said outer tube along with said inner tube, and comprising a pair of opposing locking members and a first biasing member disposed between said locking members, said biasing member biasing said locking members outwardly along a transverse axis perpendicular to the longitudinal axis to a locking position wherein said locking members extend through said first holes in said inner tube to engage said positioning holes of said outer tube such that said inner tube is disposed at an extended position relative to said outer tube;
each said locking member being formed with an engaging indentation, said locking members being contractible to an unlocking position wherein said locking members are disengaged from said positioning holes and said indentations are aligned to form an engaging hole;
a restraining member disposed in said inner tube, displaceably received within said engaging hole, said restraining member in an engaging position engaging said indentations to maintain said locking members in the unlocking position to allow said inner tube to be retracted within said outer tube, said restraining member being releasable from said engaging position responsive to contact with a releasing member disposed within said outer tube when said inner tube is fully retracted within said outer tube;
wherein said locking members are further movable to an intermediate position between the locking position and the unlocking position, said locking members being disengaged from said positioning holes of said outer tube and said indentations being offset such that said restraining member is unable to engage said indentations when said locking members are disposed at the intermediate position; and
a drive unit comprising a pair of opposing drive members and a second biasing member disposed between said drive members, said second biasing member biasing said drive members outwardly along a transverse axis wherein said locking unit is contractible responsive to expansion of said drive unit, each said drive unit comprising a pull member for pulling said locking members by a first contact portion of each said locking member to move from the intermediate position to the unlocking position, said drive unit being operable to move said locking members from the locking position to the unlocking position against biasing action of said first biasing member.

2. The telescopic adjusting mechanism as claimed in claim 1, wherein:
each said locking member has a locking part that engages a respective said positioning hole when said locking member is disposed at the locking position; and
a first slanted surface is formed on said locking part for guiding movement of said locking member from the locking position to the intermediate position when said inner tube is displaced relative to said outer tube from the extended position in a first direction along the longitudinal axis.

3. The telescopic adjusting mechanism as claimed in claim 2, wherein each said locking part is further formed with a first flat surface opposite to said first slanted surface, said first flat surface prohibiting displacement of said inner tube relative to said outer tube from the extended position in a second direction along the longitudinal axis opposite to the first direction.

4. The telescopic adjusting mechanism as claimed in claim 2, wherein:
said inner tube is formed with a pair of opposing second holes along a traverse axis and staggered with said first holes along the longitudinal axis; and
said pull member of said drive unit is movable along the transverse axis between an engaging position, where each said pull member extends through a respective said second hole in said inner tube to engage one of said positioning holes in said tube wall and pulls said locking member from the intermediate position to the unlocking position, and a disengaging position, where said pull member is disengaged from said positioning hole.

5. The telescopic adjusting mechanism as claimed in claim 4, wherein:
each said pull member having a second contact portion disposed between a respective said locking part and said first contact portion along an axis parallel to the transverse axis, said second contact portion being spaced apart from said first contact portion when said pull member is disposed at the disengaging position, and being in contact with said first contact portion for pulling said locking member to move from the intermediate position to the unlocking position when said pull member is disposed at the engaging position.

6. The telescopic adjusting mechanism as claimed in claim 4, wherein said second biasing member biased said pulled members to the engaging position.

7. The telescopic adjusting mechanism as claimed in claim 4, wherein each said pull member has an engaging part that engages releasably said one of said positioning holes, said engaging part having a slanted surface for guiding movement of said pull member from the engaging position to the disengaging position when said inner tube is displaced relative to said outer tube in a second direction along the longitudinal axis opposite to the first direction.

8. The telescopic adjusting mechanism as claimed in claim 1, wherein each of said locking members has a main body that is formed with said indentation, said main body of one of said locking members being substantially T-shaped, said main body of the other one of said locking members being substantially U-shaped for receiving slidably said T-shaped main body.

9. The telescopic adjusting mechanism as claimed in claim 1, further comprising a releasing member projecting from an inner surface of said outer tube capable of disengaging said restraining member from said engaging hole of said locking unit.

10. The telescopic adjusting mechanism as claimed in claim 9, wherein said restraining member has a first terminal part received releasably in said engaging hole when said locking members are disposed at the unlocking position, and a second terminal part, said releasing member being a projection provided in said second end of said outer tube and aligned with said second terminal part of said restraining member, said releasing member stopping co-displacement of said restraining member with said locking unit relative to said outer tube when said releasing member comes into contact with said second terminal part of said restraining member such that said first terminal part is disengaged from said engaging hole upon retraction of said inner tube into said outer tube.

* * * * *